United States Patent [19]
Liberman

[11] Patent Number: 5,642,334
[45] Date of Patent: Jun. 24, 1997

[54] PACING DEVICE FOR TAKING AN EXAMINATION

[76] Inventor: Michael Liberman, 12003 Grey Wing Sq. #C4, Reston, Va. 22091

[21] Appl. No.: 575,669

[22] Filed: Dec. 18, 1995

[51] Int. Cl.⁶ ........................................... G04F 8/00
[52] U.S. Cl. .................. 368/10; 368/107; 368/1; 368/223
[58] Field of Search .................. 368/10, 89, 107–113

[56] References Cited

U.S. PATENT DOCUMENTS

| | | | |
|---|---|---|---|
| 5,136,621 | 8/1992 | Mitchell | 377/24.2 |
| 5,140,564 | 8/1992 | Rich | 368/107 |
| 5,357,487 | 10/1994 | Coleman, III | 368/10 |
| 5,386,990 | 2/1995 | Smith | 273/32 H |
| 5,404,341 | 4/1995 | Horiguchi | 368/110 |
| 5,408,446 | 4/1995 | Ohira | 368/110 |

*Primary Examiner*—Bernard Roskoski

[57] ABSTRACT

The device of the present invention is an electronic pacer for facilitating the taking of multiple choice, short answer, or other types of examinations. More specifically, it paces an examinee on a question by question basis by providing a question number display that is incremented at a frequency that allows the examinee to devote an appropriate time to each question and finish the test in a timely manner. This has the utility of allowing an examinee to precisely and accurately determine if she is ahead of or behind schedule. Additionally, the device of the present invention tracks all answer choices and displays the distribution of those answer choices. This feature has the benefit of allowing an examinee unsure of the answer to a particular question, to consider the previously answered questions and choose an under represented answer choice as the answer to the current question.

3 Claims, 4 Drawing Sheets

PACING DEVICE FOR TAKING AN EXAMINATION

BACKGROUND OF THE INVENTION

I. Field of the Invention

The present invention relates to electronic pace setting devices in general and more specifically to electronic devices that provide a controlled pace appropriate for taking examinations of limited duration, and training for taking such examinations. The device of the present invention provides a question number display that is incremented at a frequency that allows the examinee to devote an appropriate time to each question and to finish the test in a timely manner.

II. Description of Related Art

It is considered important in many athletic events, such as running and swimming where individuals compete over a given course, to maintain a proper pace. During training, athletes often need to determine an optimum pace in accordance with their ability, so that maximum results may be achieved for a given effort. Over the years, a number of different mechanical and electronic pace setting devices have been used by athletes to help them determine an optimal pace during training as well as to monitor their pace while participating in competitions.

Jogging is a sport that has recently become popular to keep good health. To insure optimal benefits, the jogging pace should be sufficient raise the jogger's heart rate to a level appropriate to her age, weight, and physical condition. Thus, in order to aid a jogger in obtaining the maximal healthful effects of jogging, various different pace setting devices have been developed.

Pace setting devices have also been used to pace recreational athletes using golf courses, tennis courts, or other facilities that must be shared, in order to insure that no person will spend a disproportionate amount of time at their game thereby tying up such facilities.

Finally, pace setting devices have also been developed and used to pace contestants playing chess or other timed games as well as to hold musicians to proper time, meter, and rhythm.

All of these devices generate a constant tempo by providing some sort of physically perceptible repetitive signal. This signal may be visual (e.g. a flashing light), auditory (e.g. a speaker sound), or tactile (e.g. a vibratory oscillation).

BRIEF SUMMARY OF THE INVENTION

I. Nature and Substance of the Invention

While electronic pace setting devices have been developed for athletes and other persons, these devices are not appropriate for students or examinees who are taking, or preparing to take, multiple choice or short answer examinations.

Examinees, nevertheless, have a need for an appropriate pace setting device to help them manage their time while taking an examination. This is especially true for multiple choice or short answer tests that have a large number of questions and allow only a minute or two for answering each question. In such tests, the "maintenance" time of checking a clock to pace oneself is likely to be comparable to the "productive" time of solving problems. Furthermore, because of the short time allocated to each problem, examinees are forced to pace themselves by setting "time-checkpoints" or "time-milestones" corresponding to groups of 5, 10, 15, or more questions and they have no practical way of checking their pace on a question by question basis.

Additionally, when taking multiple choice tests which allow only a limited number of answer choices, examinees may wish to keep track of the distribution of their answer choices. This would allow an examinee unsure of the answer to a particular question, to consider the previously answered questions and choose an under represented answer as an answer to the current question. This strategy may prove beneficial in taking multiple choice tests in which the correct answer choices are either uniformly or randomly distributed.

The present invention is an electronic pacing device that tracks an examinee's answer choices and provides a convenient means of monitoring and budgeting time on a question by question basis. This invention allows an examinee to more easily determine if she is behind schedule and must speed up or if she ahead of schedule and may slow down and devote more time to each question. Furthermore, it provides an examinee with an intelligent way of guessing answers on multiple choice tests in which the correct answer choices are either uniformly or randomly distributed.

II. Objects of the Invention

It is an object of the present invention to provide an electronic pacing device that may be readily used by students and other examinees when taking, or preparing to take, multiple choice or short answer examinations.

A further object of the present invention is to provide an examinee with an accurate estimate of how well she is pacing herself, by displaying the question number which the user should be working on at any given time. This allows the examinee to budget her time with respect to each individual question which is something that cannot be easily achieved with an ordinary wristwatch.

Another object of the present invention is to provide an electronic pacing device that also performs as a mechanical pencil with a built in pacing display whereby an examinee taking a test may monitor her time without having to divert her eyes from the test papers. Still a further object is to provide an electronic pacing device for a multiple choice examination which tracks an examinee's answer choices and provides a "best guess" answer to the current question based on the assumption that the correct answer choices are uniformly or randomly distributed.

Additional objects and advantages of the invention are set forth in the drawings, description, and claims which follow. Some objects and advantages will be apparent from the instrumentalities and combinations particularly pointed out while other objects and advantages may be learned by the practice of the invention.

BRIEF DESCRIPTION OF THE DRAWINGS

The following drawings, which are incorporated in and constitute a part of the specification, serve to explain the principles of the present invention when they are taken together with the general description given above and the detailed description of the preferred embodiments given below. Moreover, the aforementioned objects and advantages of the present invention, as well as additional objects and advantages thereof, will become apparent when consideration is given to the following detailed description which should be read in conjunction with the following drawings wherein.

DETAILED DESCRIPTION OF THE INVENTION

An electronic pacing device having particular application for use by students, examinees, and other persons who are taking, or preparing to take, multiple choice or short answer examinations is disclosed. In the following description well known systems are shown in diagrammatic or block diagram form in order not to obscure the present invention unnecessarily. Moreover, this specification sets forth many specific details, numbers, materials, and configurations only for purposes of explanation and to provide a thorough understanding of the present invention. However, it is apparent to one skilled in the art that the present invention may be practiced by application of numerous modifications obvious to those skilled in the art without making use of the specific materials and details shown and described.

Figure 1:
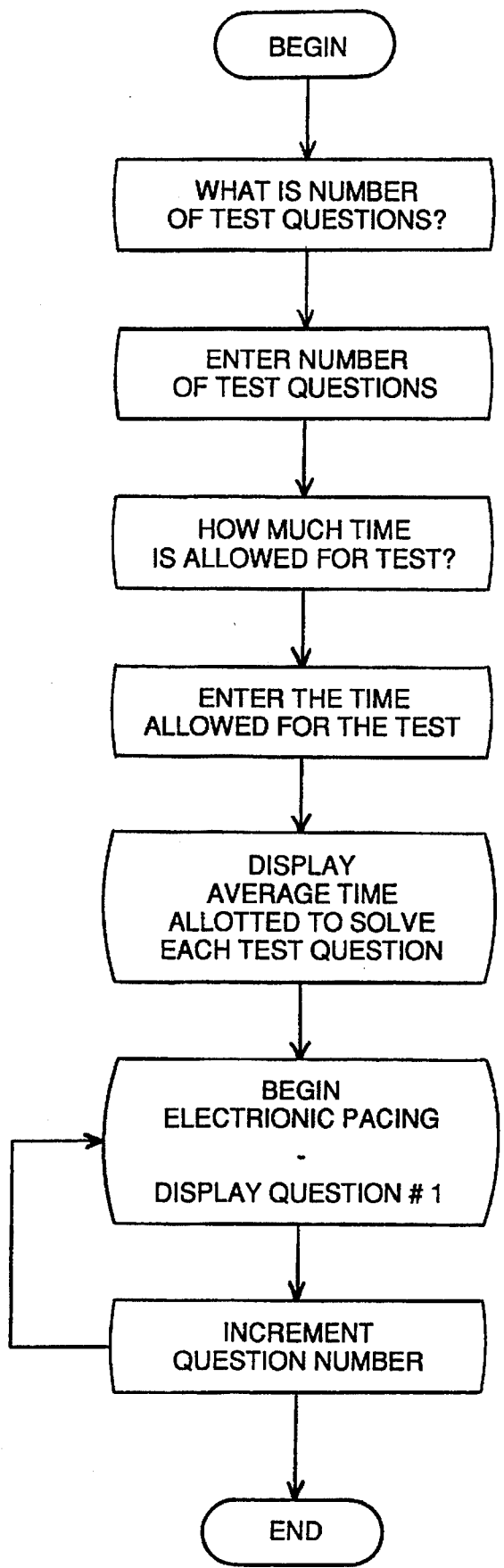
FIG. 1 is a flow diagram of the essential sequence of processing in the present invention.

FIG. 1 is a flow diagram illustrating the essential sequence of processing in the device of this invention. This sequence is initiated in step S1 when a user actuates an ON switch. When the ON switch is actuated, a microprocessor responds in Step S2 by displaying a prompt that asks the user to enter the number of test questions N. In Step S3, the user answers the prompt by typing in the total number of test questions N via a keypad. After the user presses an ENTER key, the microprocessor stores this information and sends the next prompt to the display screen (Step S4). This prompt requests the time T allotted to complete the examination. The test time T is entered in Step S5 when the user replies to this prompt by typing in the time T and pressing the ENTER key. After the ENTER key is pressed, the microprocessor responds in Step S6 by calculating the average number of seconds A that are allotted for solving each test question (i.e. A=T/N) and displaying this result to the user. In Step S7, the user launches the electronic pacing function by pressing a START button at which time the microprocessor starts a timer clock and simultaneously causes the question number "1" to be displayed indicating that the user should now start working on the first test question. In Step S8, the microprocessor increments a counter every A seconds which continuously updates the display screen showing the question number which the user should be working on at any given time. Thus, there is provided a numeric display by which the user may pace herself until the time for completion of the test has expired at which time the pacing function is discontinued (Step S9).

Figure 2:
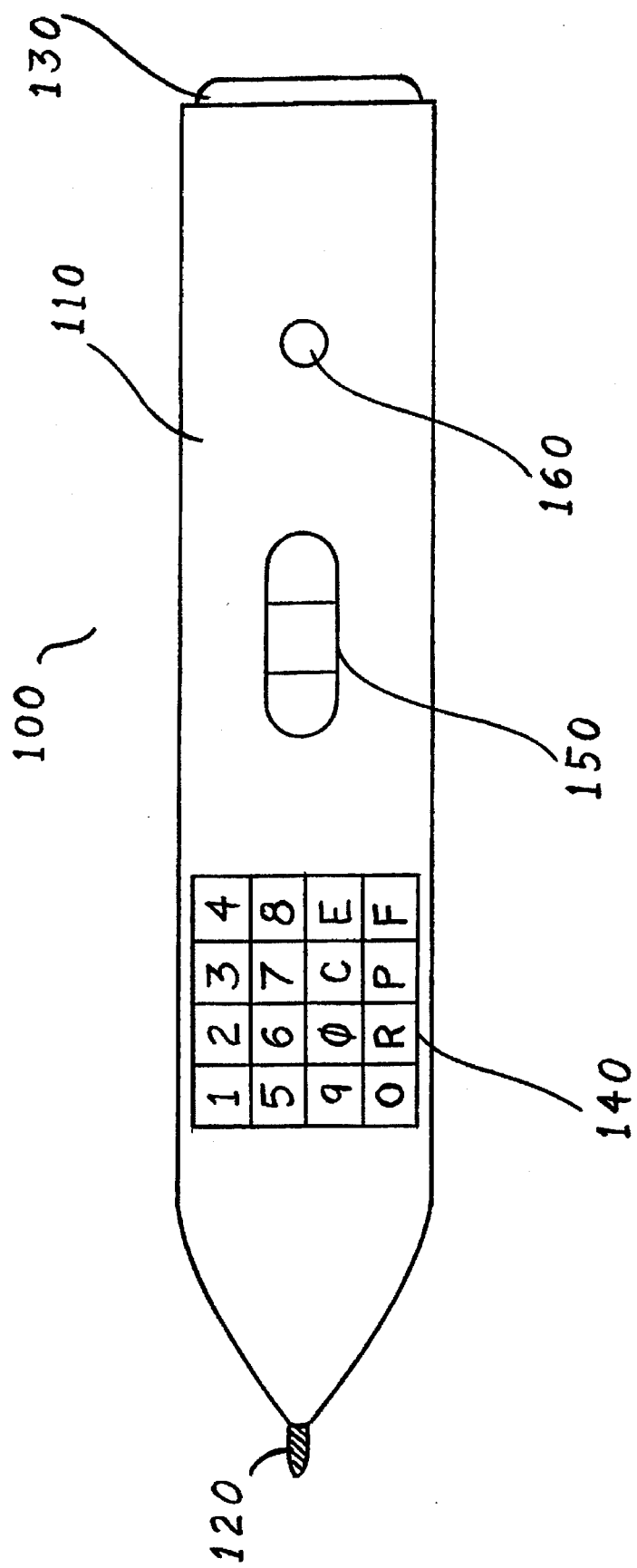
FIG. 2 illustrates a first embodiment of the present invention.

Referring now to the specific embodiment of FIG. 2, reference numeral 100 refers to a hand held electronic pacing device of the present invention. Device 100 is a self contained, battery operated, portable device. It comprises among other elements, a cylindrical housing 110, a keypad 140, an LCD character display 150, and an LED warning light 160. In addition, encased within the housing 110 are a mechanical pencil mechanism, a microprocessor, an electronic timing clock and a counter, all of which are described further in the text below.

The cylindrical housing 110 and the mechanical pencil mechanism contained within the cylindrical housing, together with a pushbutton 130 and a pencil lead 120, cooperate to allow this embodiment to additionally function as a conventional mechanical pencil. For examinations that may be answered in pencil, this embodiment is particularly advantageous because it allows the pacing display to remain in full view while the examinee is answering the examination. Mechanical pencils include screw-type pencils in which a pencil lead is propelled by a screw that is activated by twisting one end of the pencil; conventional pushbutton pencils in which a lead is advanced by the push of a thumb on the top of the pencil; and pushbutton pencils in which a lead is advanced by pressing a fingertip against the side of the pencil. While the embodiment of FIG. 2 utilizes the mechanism of a conventional pushbutton pencil, any other type of mechanical pencil mechanism would do just as well for the purposes of the present invention. Because the technology of mechanical pencils is well known it need not be described in further detail herein.

Figure 3:
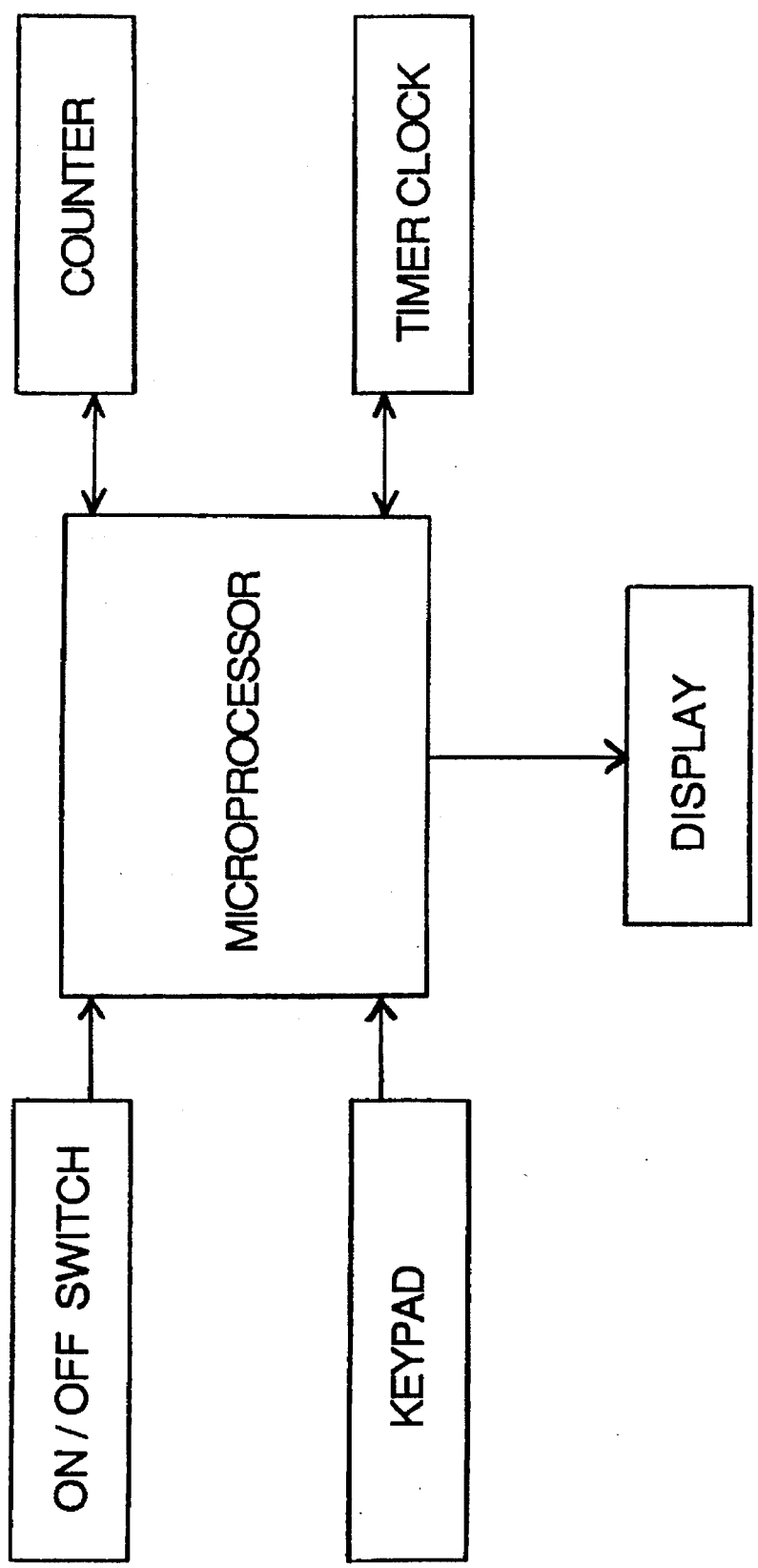
FIG. 3 is a block diagram showing the interactive relationship between various elements of the present invention.

This embodiment is also provided with a timing clock, a counter, and a microprocessor which is programmed to control the pacing function of the present invention. The interactive relationship between these elements is illustrated in the block diagram of FIG. 3. Together, these elements cooperate to give the user instructions in the form of prompts via the LCD display 150; to store various numerical inputs provided by the user; to make calculations (e.g. the average time that should be allotted to each test question); to provide a warning signal; and to pace a user taking an examination by displaying, on the LCD display 150, the question number that said user should be working on at any given time. These specific functions, as well as the sequence in which they are executed, are more fully described throughout the text of this specification. The technology for controlling and implementing these functions, however, is well known in the art and further description of such technology is unnecessary to understand the subject matter of this invention.

Referring back to FIG. 2, the keypad 140 has an upper portion which includes ten keys for the numerals 0 through 9, a CLEAR key C which clears the display 150, and an ENTER key E which the user actuates to input data that the user has typed in. The keypad also has a lower portion with an ON key O, a START/RESUME key R, a PAUSE key P, and an OFF key F. The ON and OFF keys function to turn the device on and off respectively. When the START/RESUME key is pressed the device begins or resumes its electronic pacing function. When the PAUSE key is pressed the device suspends its electronic pacing function and stops incrementing the question number.

The LED warning light 160 of this specific embodiment is set to begin flashing on and off at some predetermined time, say 10 minutes, before the end of a test. In other embodiments the warning time may be set by the user. Furthermore, while this embodiment utilizes a warning light, any other suitable warning indicator, such as a sound speaker or a vibratory motor, would do just as well.

Device 100 will be of benefit to any student, examinee, or other person taking, or training to take, a multiple choice or short answer test by providing an accurate pace setting standard. By matching this pace the examinee will be able to devote an appropriate time to each question and finish the test in a timely manner. Thus, this invention provides a convenient means of monitoring and budgeting an examinee's time. For example, if the examinee, glancing at the LCD display, sees that she is ahead of schedule she may slow down and devote more time to each question. On the other hand, if she sees that she is behind schedule she may choose to speed up her pace.

Just prior to taking a test, the user must enter, into device 100, that data which is specific to the test she is preparing to take (i.e. the number of test questions and the time allotted for completing the test). To accomplish this, the user begins by depressing the ON key. As soon as the ON key is depressed, a prompt will appear on the LCD display 150 requesting the number of test questions. The user then types, on keypad 140, the number of test questions and depresses the ENTER key. After the ENTER key is depressed, a second prompt will be displayed. This prompt asks for the time allowed for completing the entire examination. The user, replies to this prompt by typing the allowed time on the keypad 140 and pressing the ENTER key.

As the user types in the input data, it is immediately displayed for verification on the LCD display. If, prior to pressing the ENTER key, the user wishes to alter the data which she has typed in, then the user may clear the display, by depressing the CLEAR key, and retype the correct data. After the user is satisfied that the data has been typed correctly, she may depress the ENTER key to enter the data into device 100. After all of the required data has been entered, the microprocessor will display the average time allocated for each question.

The user then waits until the test, or practice test, begins, at which time the user depresses the START/RESUME key to begin the electronic pacing. At this point, there will be displayed, starting with question number 1, the number of that question which the user should currently be trying to solve. This question number will be continuously incremented to properly pace the user. If the user wants to take a break during a practice session, she may press the PAUSE key thereby temporarily halting the pacing process. By depressing the START/RESUME key the user may resume pacing herself.

During practice drills, a user may choose to enter longer than usual time periods to complete sample tests thereby slowing down the practice pace. As the user improves her test taking skills, she may gradually increase the practice pace.

Figure 4:
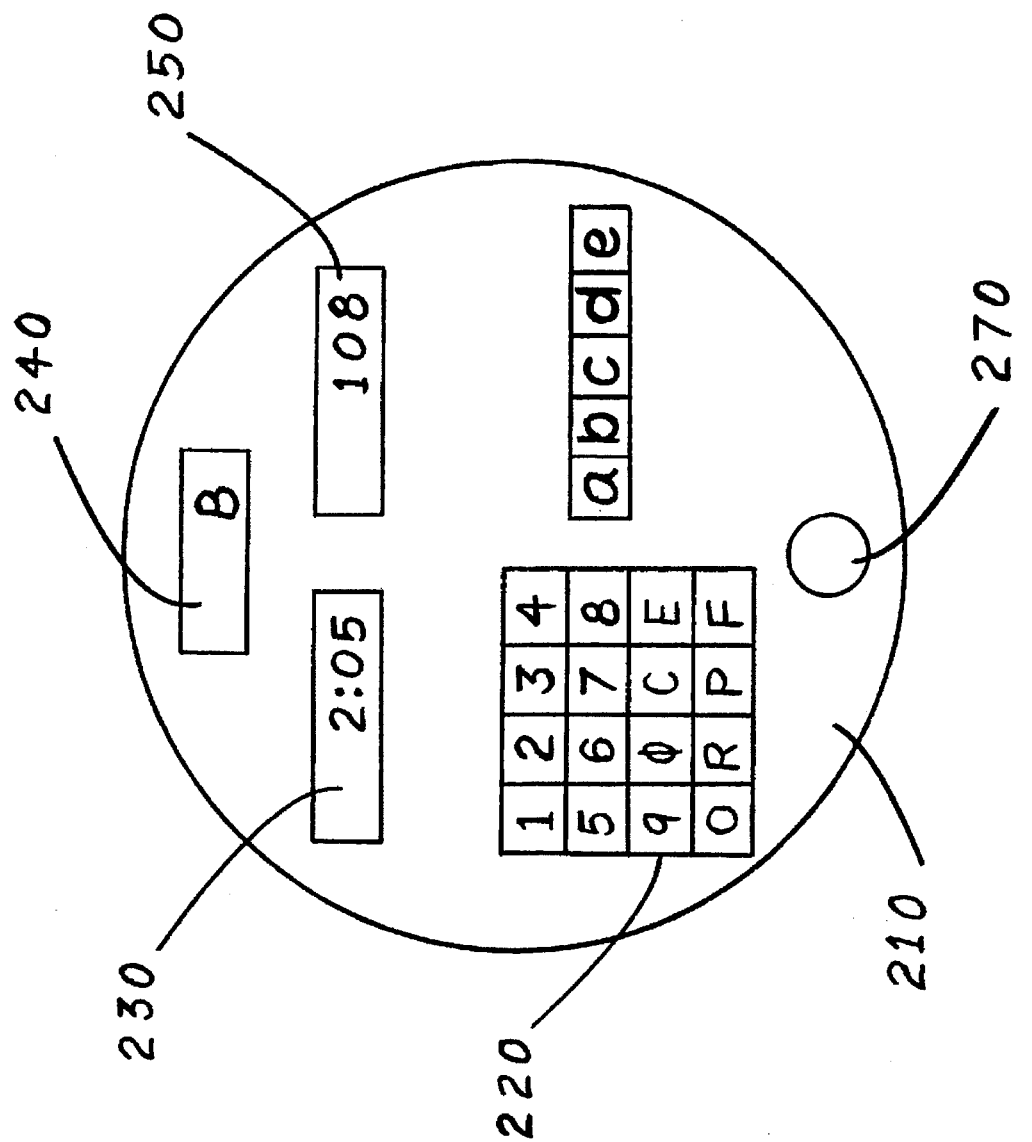
FIG. 4 illustrates a second embodiment of the present invention.

In a different embodiment, shown in FIG. 4, reference numeral 200 refers to another hand held electronic pacing device. Device 200 is also self-contained, battery operated, and portable. It comprises among other elements, a watch case housing 210, a keypad 220, a set of five function keys "a"–"e", a digital time display 230, an LCD display 250 for data input, a separate LCD display 240 for indicating a possible answer response, and an LED warning light 270. In addition, encased within the housing 210 are a microprocessor, an electronic timing clock and a counter, all of which have been previously described with respect to the embodiment of FIG. 2.

The watch case housing 210 and the microprocessor contained within, together with the timing clock and the digital time display 230, cooperate to allow the embodiment of FIG. 4 to additionally function as a watch. The technology involved in this function is well known and need not be described in further detail herein. Including a wrist band with this particular embodiment of the present invention allows the user to conveniently wear and use this device like an ordinary wrist watch. While this embodiment discloses a watch case housing to allow the inclusion of a watch band for convenience, the present invention may also be realized in the embodiment of a hand held calculator in which case the housing would be suitably configured and the microprocessor appropriately programmed.

The microprocessor of device 200 is also programmed to work with the timing clock and the counter to control the pacing function of the present invention. Together, these elements cooperate to display prompts to the user; to store various numerical inputs provided by the user; to make calculations; to provide a warning signal; and to pace a user taking an examination by displaying, on the LCD display 250, the number of the question that said user should be trying to solve at any given time. These specific functions, as well as the sequence in which they are performed, have been described above with respect to the embodiment of FIG. 2.

The keypad 220 of this embodiment is identical to the keypad of the embodiment of FIG. 2 which has been described above. It too, has an upper portion including keys for the numerals 0 through 9, a CLEAR key C, and an ENTER key E, as well as a lower portion with an ON key O, a START/RESUME key R, a PAUSE key P, and an OFF key F.

The embodiment of FIG. 4 is specifically applicable to multiple choice examinations because of its "best guess" mode of operation. In particular, the microprocessor of this embodiment is also programmed to keep track of the answers to questions as the test progresses and based upon this data to provide a statistical "best guess" for the answer to the next unanswered question. This "best guess" aspect of the invention is further described below, but the specific technology involved is well known in the art thereby rendering illustrations and additional description of such technology unnecessary to understand the subject matter of this invention.

Standard multiple choice tests typically have four or five possible answers to each question. Thus, five function keys a, b, c, d, and e, corresponding to five possible answers, are utilized to implement the "best guess" mode of this specific embodiment. As each question is answered, the examinee depresses the function key that corresponds to the correct answer. The microprocessor keeps a separate numerical count for each of these five possible answers. These counts are not necessarily provided on any of the displays, but rather, they are held in memory. As the test progresses, the answer that has occurred the least number of times is displayed on the LCD display 240 as the "best guess" for the next question. When the examinee is unsure of an answer she may wish to use the "best guess" answer as her choice. The examinee may do this as she proceeds with the test, or she may skip all of the questions of which she is unsure of the answer and fill them in with the "best guess" answer at the end of the test. The techniques for cumulating counts in memory and for determining the smallest of a group of counts are well known and need not be described in detail.

The LED warning light 160 of this specific embodiment is set to begin flashing at some predetermined time before the end of an examination. While this embodiment utilizes a warning light, other suitable warning indicators may be used instead.

Device 200 will be of particular benefit to any student or examinee taking a multiple choice test. In particular, by displaying the question number which the user should be working on at any given time, this embodiment allows the examinee to budget her time with respect to each individual question. Because multiple choice tests generally comprise a large number of questions to be answered in a relatively short time, the examinee is expected to spend some small fractional number of minutes on each question. Thus, this invention, with its "question number" pacing display, allows precise question by question time monitoring which is not easily achieved with an ordinary wristwatch. Finally, this embodiment of the present invention also provides the examinee with a "best guess" answer which may be used whenever the examinee is unsure of an answer.

The user begins by entering the number of test questions and the time allotted for completing the test in the same way as has been described above with respect to the embodiment of FIG. 2. The user may also start, pause, and resume the electronic pacing feature by depressing the appropriate keys on the lower portion of keypad 220. Thereafter, electronic pacing on a question by question basis proceeds in the same manner as it does in the embodiment of FIG. 2.

To implement the "best guess" mode however, an examinee must utilize the function keys specific to this embodiment of the invention. In this mode of operation, after answering each question, the examinee presses the function key corresponding to the correct answer for that question. As the microprocessor cumulates counts on the different answer choices, it displays, on the LCD display 240, that answer choice which has occurred least often. Assuming that the correct answer choices are evenly, or randomly, distributed among all of the questions, it is to be expected that those correct answer choices that have occurred least often among the questions already answered are more likely to occur in the remaining group of unanswered questions. Thus, this bias toward under represented answer choices within any remaining unanswered group of questions is displayed as a "best guess" answer. While this embodiment discloses only one "best answer," other variations on this theme (e.g. displaying the distribution of all previous answer choices) would do just as well.

Naturally, the present invention may be realized in many other embodiments. Of particular interest are those embodiments that allow simultaneous use by groups of students and examinees. In one embodiment, for example, the invention may be in the form of a wall clock with a large display screen for use in a classroom during training sessions or in an auditorium where an examination is being administered. In this case, the data specific to the test being administered would be entered by one of the people supervising the test. In another embodiment meant for simultaneous use by many examinees, the present invention may take the form of a specially programmed computer with multiple terminals. In this case, the test questions would be displayed, one at a time, on each terminal. After an examinee answers a particular question, the next question would be displayed on her individual terminal screen so that each examinee could progress through the test at her own pace. However, in accordance with the present invention, a small display window on the terminal screen would continually pace the examinee by displaying the number of the question that an examinee following a steady and uniform pace should be currently trying to solve.

Thus, an improved electronic pacing device has been disclosed. The present invention permits a student, examinee, or other person to prepare for and take tests more easily than has been previously been possible.

Regarding the above description, it should be realized that the precise relationships shown and described may be readily altered in varying degrees while achieving the essential objectives of the invention. Furthermore, numerous modifications of the housing and configurations shown and described, will readily occur to those skilled in the art. Such changes may include using different types of display screens, keypad mechanisms, and warning indicators. It is therefore, not desired to limit the invention to the exact construction and operation shown and described, and accordingly, all suitable modifications and equivalents are intended to be encompassed by the present invention, the scope of which is indicated by the appended claims.

What is claimed as being new and desired to be protected by Letters Patent of the United States is as follows:

1. An electronic device for aiding an examinee in taking, or practicing to take, a multiple choice examination, comprising:

(a) a housing;

(b) a keypad means, located on said housing, for entering input data associated with said multiple choice examination;

(c) a set of function keys located on said housing, said function keys corresponding to the answer choices allowed on said multiple choice examination, for entering the answers to each question;

(d) a microprocessor contained within said housing, said microprocessor programmed to keep a separate numerical count for each of the answers selected by said examinee on said multiple choice examination; and (e) a display means located on said housing for indicating the distribution of previous answer choices, and wherein said microprocessor is further programmed to cause said display means to show the distribution of previous answer choices whereby the examinee is aided in taking, or practicing to take, a multiple choice examination.

2. An electronic device according to claim 1, further comprising a mechanical pencil mechanism affixed to said housing whereby said electronic device also functions as a lead writing instrument.

3. The electronic device of claim 1, further comprising a timer means for displaying time.

* * * * *